Patented Nov. 10, 1925.

1,560,542

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE ACETATE COMPOSITION.

No Drawing.  Application filed July 28, 1924. Serial No. 728,729.

*To all whom it may concern:*

Be it known that I, STEWART J. CARROLL, a citizen of the United States of America, residing at Rochester, in the county of Monroe and State of New York, have invented certain new and useful Improvements in Cellulose Acetate Compositions, of which the following is a full, clear, and exact specification.

This invention relates to a composition of matter in which cellulose acetate is combined with one or more other substances, so that the resulting product is available for use in the plastic and analogous arts, such for instance as sheet or film manufacture and varnish manufacture. One object of my invention is to provide a composition of matter which may be made into permanently transparent, strong and flexible sheets or films of desired thinness, that are substantially waterproof, are unaffected by ordinary photographic fluids and possess the desired properties of a support for sensitive photographic coating. Another object of my invention is to produce a flowable composition of matter capable of easy manipulation in the plastic, film making and varnish making or allied arts, which will not injure or be injured by the substances with which it is associated during manufacture, storage or use. Other objects will hereinafter appear.

I have found that a composition of matter having the desirable qualities hereinabove enumerated can be obtained by mixing or compounding cellulose acetate, such as the acetone-soluble variety, with cresyl p-toluene sulfonate. The compounding is performed in such a way that both of the above mentioned ingredients are brought to the colloidized state, as distinguished from the powdery or fibrous state in which they may initially exist. This changing of them into a mixture in which they exist in the colloidal form is preferably brought about by the aid of a common solvent, such as acetone. The solution in such a solvent is colloidal, and the ingredients exist in a colloidized form even in films made by spreading the solution and evaporating off the volatile ingredients until the films set. I shall give specific examples of my invention hereinafter by way of illustration, but it will be understood that the invention is not restricted to the details thereof, except as indicated in the appended claims.

A flowable film-forming composition may, for instance, be prepared by dissolving 100 parts of cellulose acetate by weight, say the acetone-soluble variety, in 400 to 500 parts of acetone along with 5 to 60 parts (say 30 parts) of cresyl p-toluene sulfonate. Since it is more readily available, I prefer to use the ortho cresyl p-toluene sulfonate. In general, I also prefer to have the weight of the latter material less than the weight of the cellulose acetate.

Other materials may be added to the mixture or dope, such as triphenyl phosphate, tricresyl phosphate, chlorinated naphthalenes, butyl alcohol, amyl alcohol, camphor and the like. For example 100 parts of cellulose acetate of the acetone-soluble type are dissolved in 400 to 500 parts of acetone or equivalent volatile solvent. They are likewise worked into the mixture 5 to 30 parts of ortho cresyl p-toluene sulfonate and 5 to 20 parts of monochlornaphthalene.

The solutions given in the hereinabove described examples are sufficiently thick and viscous to be properly flowed during sheet or film manufacture, the acetone volatilizing but not too rapidly to impair the product. The resulting films contain cresyl p-toluene sulfonate, which imparts to them valuable flexibility along with other properties desirable in a photographic support.

Where more readily flowable solutions are wanted, the ones given in the hereinabove mentioned examples may be diluted by adding more acetone until the desired viscosity is obtained. Moreover, the dilution may be effected with non-solvents, such as benzol and ethyl alcohol, to a moderate degree which does not bring about precipitation of the other ingredients in the solution.

Having thus described my invention, what I claim as new and desire to secure by Letters Patent is:

1. A composition of matter comprising acetone-soluble cellulose acetate and cresyl p-toluene sulfonate, the weight of the latter being less than the weight of the former.

2. A composition of matter comprising a solution of colloidized acetone-soluble cellulose acetate containing cresyl p-toluene sulfonate.

3. A flowable film-forming composition of matter comprising acetone-soluble cellulose acetate, ortho cresyl p-toluene sulfonate, and acetone.

4. A composition of matter comprising 100 parts by weight of acetone-soluble cellulose acetate and from 5 to 60 parts of cresyl p-toluene sulfonate.

5. As an article of manufacture, a deposited or flowed film comprising acetone-soluble cellulose acetate and cresyl p-toluene sulfonate.

6. As an article of manufacture, a flexible, transparent, deposited or flowed film comprising acetone-soluble cellulose acetate and cresyl p-toluene sulfonate, the weight of the latter ingredient being less than 60% of the weight of the former.

Signed at Rochester, New York, this 19th day of July, 1924.

STEWART J. CARROLL.